UNITED STATES PATENT OFFICE.

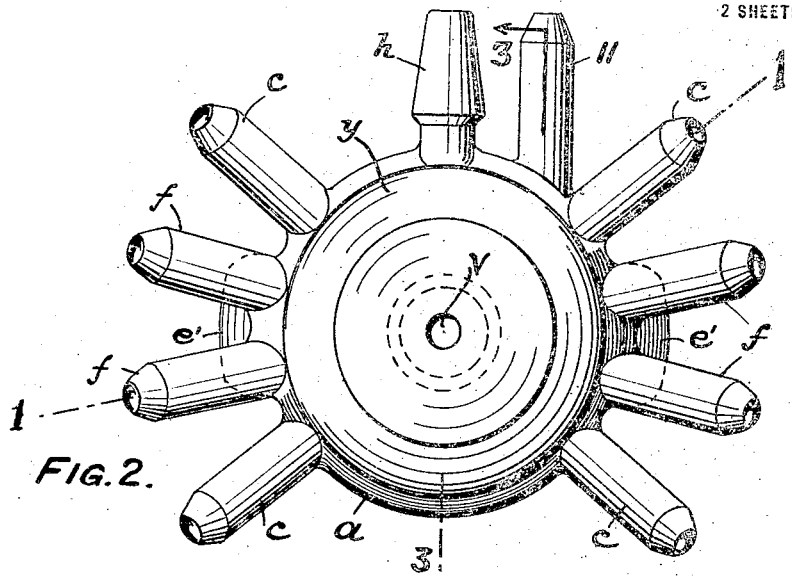
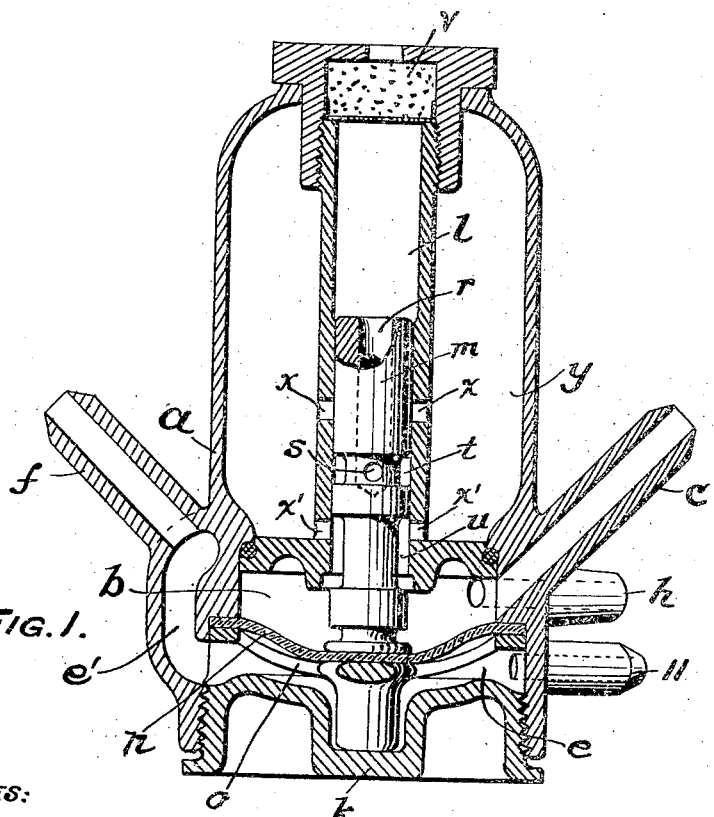

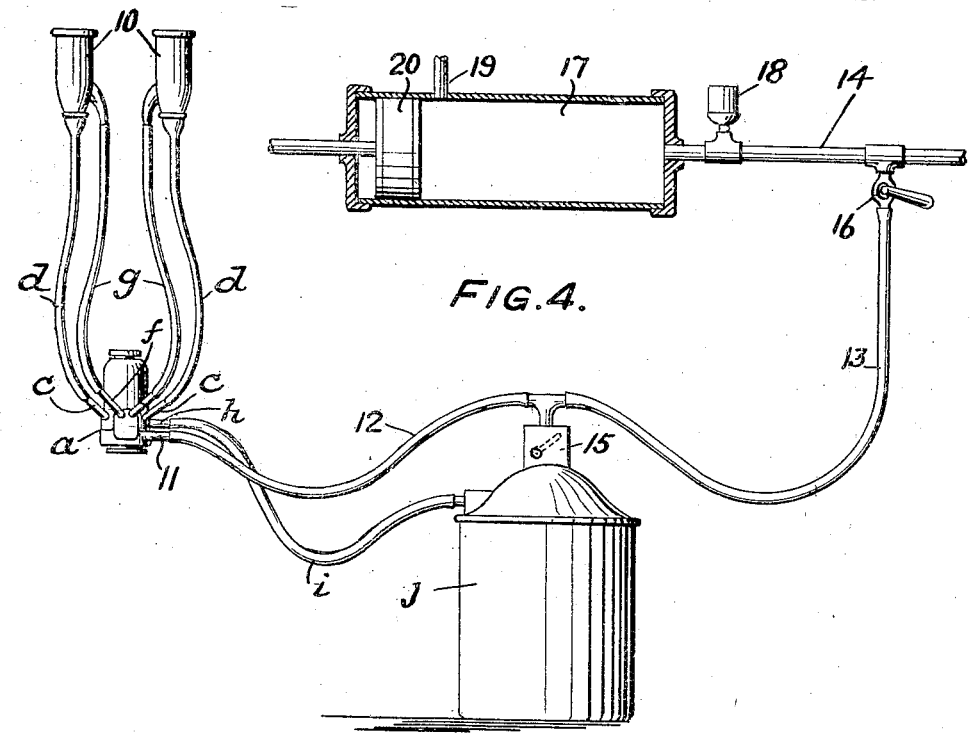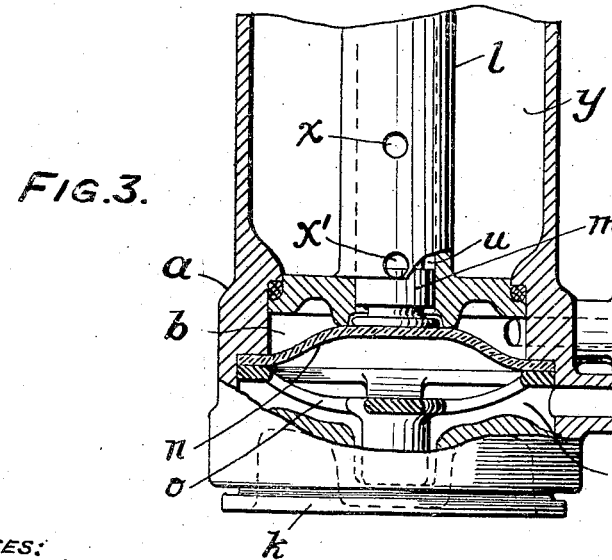

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,195,996.      Specification of Letters Patent.      Patented Aug. 29, 1916.

Application filed February 16, 1915. Serial No. 8,457.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to cow milking machines of the type having two chambered teat cups.

In a patent issued to me Dec. 7, 1915, No. 1,163,161, on an application filed of even date herewith, Serial No. 8455, I have set forth a machine in which a single cylinder pump or its equivalent performs the functions of both an exhauster for the milk pail and inner teat cup chamber and a pulsator for producing pulsations in the outer teat cup chamber. In another application, Serial No. 8456, I have set forth an improvement on said machine, in which means are provided to produce pulsations in the inner teat cup chamber and the milk discharge therefrom to the milk pail by intermittently admitting measured volumes of air to break the vacuum, this result being accomplished by means of a valve whose operation is controlled from the pump. The present invention has for its object to perfect the construction of the last named application. Again, in the last named application, the vacuum in the milk discharge is reduced twice to each compression of the teats. In the present application, the construction is such that the vacuum is broken only once per cycle.

A preferred embodiment of the invention is shown in the accompanying drawings, in which—

Figure 1 is a vertical sectional view of the secondary pulsator, on the line 1—1 of Fig. 2. Fig. 2 is a plan view of the pulsator. Fig. 3 is a partial vertical section on the line 3—3 of Fig. 2. Fig. 4 is a diagrammatic view of a complete installation comprising one unit.

A claw $a$ has a central chamber $b$ from which project four tubes $c$ adapted to connect to flexible extensions $d$ from the inner or teat receiving chambers of the teat cups 10 and one tube $h$ adapted to connect to a flexible tube $i$ leading to the milk pail $j$. Separated from the chamber $b$ by a flexible diaphragm $n$ is a second chamber $e$ having extensions $e'$ from which project four tubes $f$, adapted to be connected by flexible pipes $g$ with the outer chambers of the teat cups 10. From the same chamber $e$ a single tube 11 is provided for connection to a source of pneumatic pulsations. The diaphragm $n$ is held in place by a spider $o$ forced upward by the plug $k$ which screws into the bottom of the claw and forms the lower side of the chamber $e$. The upper side of the chamber $b$ is formed by a flange on the lower end of a cylinder $l$ in which reciprocates a piston valve $m$. The piston valve $m$ has a central bore $r$ communicating by ports $s$ with an annular groove $t$ and has also an annular groove $u$. Through the wall of the cylinder $l$ are ports $x$ and $x'$ providing communication between the bore of the cylinder and an air chamber or reservoir $y$ surrounding the cylinder. Above the cylinder $l$ and separated from it by a perforated plate is a small chamber $v$ filled with absorbent cotton or other material suitable for filtering air drawn into the cylinder.

A flexible tube 12 connects the tube 11 with a pipe 13 leading from the milk pail to the stanchion pipe line 14. At 15 is a check valve allowing air to pass from the milk pail $j$ toward the pipe 13 but preventing its return.

The pipe line 14 has cocks 16 and pipe connections at the stanchions. A pump cylinder 17 is connected to the pipe line 14 and has an air discharge valve 18. If it is desired that the compression of the teats be quick and snappy, a port 19 is provided in the pump cylinder so located that, as the piston 20 nears the end of its suction stroke, it will be uncovered and allow a sudden rush of air at atmospheric pressure into the system. If a slow application of pressure is desired this port is omitted and the compression takes place gradually as the pump piston moves on its compression stroke.

The operation is as follows: After the pipe 13 is connected to the line 14 and the cock 16 opened, the pump on each suction stroke draws air from the pipes 14, 13, 12, the pail $j$ and the pipe $i$. On the compression stroke air is returned into the pipes 14, 13, 12 till the pressure exceeds that of the atmosphere enough to lift the valve 18 and allow the excess air to escape. After a few strokes of the pump the vacuum in the pail $j$ approaches the maximum obtainable with the pump and remains approximately constant, while the pressure in the pipe 12 varies during each cycle from atmospheric to the maximum vacuum obtainable with the pump. During the suction stroke of the pump the air is exhausted from the chamber $e$ to the same extent as from the chamber $b$, so that the diaphragm $n$ is free, and atmospheric pressure acting on top of the piston valve $m$ forces it down to the position shown. Air previously stored in the reservoir $y$ now escapes through the ports $x'$ and groove $u$ into the chamber $b$, thus momentarily breaking the vacuum in this chamber and in the inner chambers of the connected teat cups. At the same time the outer chambers of the teat cups are, because of their connection with the chamber $e$, exhausted to the full vacuum and the flexible partition is expanded to its full size, allowing the teat to fill with milk and at the same time be drawn down into the teat cup. The air and milk soon pass from the chamber $b$ through the pipe $i$ to the pail and the air is drawn off through the check valve 15 and the pipes 13 and 14. On the compression stroke of the pump air coming back through the pipes 14 and 13 is prevented by the check valve 15 from reaching the pail $j$ but by the pipe 12 enters the chamber $e$. Through the extensions $e'$ and tubes $f$ and $g$ it reaches the outer chamber of the teat cups and, because the inner chamber is connected through the pipes $d$ and $c$, the chamber $b$ and the pipes $h$ and $i$ with the milk pail constantly under suction, it causes the flexible partition to collapse and compress the teat forcing the milk out. At the same time the pressure acting under the diaphragm $n$ forces it and the piston valve $m$ up. The lower edge of the groove $u$ closes the port $x'$ and later the diaphragm $n$, touching the circular bead around the lower end of the cylinder $l$, seals the opening so as to prevent any leak. The annular groove $t$ uncovering the port $x$ allows air, coming through the filter $q$, the cylinder $l$, the bore $r$, and the port $s$, to fill the reservoir $y$ ready for the next cycle.

It is readily seen that the teats are subjected simultaneously to a squeeze and a maximum suction and alternating with this a release accompanied by a reduction of suction.

Having now fully described my invention, what I claim and desire to protect by Letters Patent is:

1. In a milking machine, in combination, a double chambered teat cup, a pipe leading to the outer chamber of the teat cup and through which pressure fluid is admitted to and exhausted from the outer teat cup chamber to produce pulsations therein, a milk discharge, constantly under suction, from the inner chamber of the teat cup, said milk discharge being closed against admission of pressure fluid from said pipe, and means to admit pressure fluid from another source to the milk discharge at intervals corresponding to the number of said pulsations.

2. In a milking machine, in combination, a double chambered teat cup, a pipe leading to the outer chamber of the teat cup and through which pressure fluid is admitted to and exhausted from the outer teat cup chamber to produce pulsations therein, a milk discharge from the inner chamber of the teat cup constantly under and in communication with a source of suction, said milk discharge being closed against admission of pressure fluid from said pipe, and means to admit pressure fluid from another source to the milk discharge alternately with the admission of pressure fluid to the outer teat cup chamber and to exclude admission of pressure fluid to the milk discharge during the remainder of each pulsation.

3. In a milking machine, in combination, a double chambered teat cup, a pipe leading to the outer chamber of the teat cup and through which pressure fluid is admitted to and exhausted from the outer teat cup chamber to produce pulsations therein, a milk discharge from the inner teat cup chamber constantly under suction, a source of pressure supply independent of the outer teat cup chamber, a valve adapted in its movement to alternately connect and disconnect the milk discharge with said pressure supply, and means to actuate the valve to effect such connection at intervals corresponding to the number of said pulsations.

4. In a milking machine, in combination, a double chambered teat cup, a claw having a pulsation chamber connectible to the outer teat cup chamber and to and from which pressure fluid is alternately admitted and exhausted to produce pulsations, an independent milk receiving chamber in said claw connectible with the inner teat cup chamber and adapted to be placed under continuous suction, a source of pressure fluid supply independent of the pulsation chamber, a valve adapted in its movement to alternately connect and disconnect the milk discharge with said pressure supply, and means to actuate the valve to effect such connection at intervals corresponding to the number of said pulsations.

5. In a milking machine, in combination, a double chambered teat cup, a pipe leading to the outer chamber of the teat cup and through which pressure fluid is alternately admitted and exhausted to produce pulsations therein, a milk discharge from the inner teat cup chamber, a valve, a pipe leading to the valve, and common pulsating means to maintain continuous suction in the milk discharge and to produce pulsations in the last named pipe to control the operation of the valve, said valve adapted in its movement to admit to the milk discharge pressure fluid from a source of supply independent of the outer teat cup chamber at intervals corresponding to the number of said pulsations.

6. In a milking machine, in combination, a double chambered teat cup, a pipe leading to the outer chamber of the teat cup and through which pressure fluid is admitted to and exhausted from the outer teat cup chamber to produce pulsations therein, a milk discharge, constantly under suction, from the inner chamber of the teat cup, an air reservoir independent of the outer teat cup chamber, an air valve adapted in its movement to connect said reservoir with the milk discharge simultaneously with the exhaustion of pressure fluid from the outer teat cup chamber and to close said connection and connect said reservoir with the atmosphere simultaneously with the admission of pressure fluid to the outer teat cup chamber, and means to operate the valve.

7. In a milking machine, in combination, a double chambered teat cup, a milk discharge from the inner teat cup chamber, common pulsating means to produce continuous suction in the milk discharge and pulsations in the outer chamber of the teat cup so as to intermittently compress the teat, and separate means controlled by the first means to reduce the vacuum in the milk discharge at intervals corresponding to said pulsations.

8. In a milking machine, in combination, a double chambered teat cup, a milk discharge from the inner teat cup chamber, common pulsating means to produce continuous suction in the milk discharge and pulsations in the outer chamber of the teat cup so as to intermittently compress the teat, and an air valve controlled by said means to admit pressure fluid to the milk discharge simultaneously with the reduction of pressure in the outer teat cup chamber and to close the admission of pressure fluid to the milk discharge simultaneously with the increase of pressure in the outer teat cup chamber.

9. In a milking machine, in combination, a double chambered teat cup, a milk discharge from the inner chamber thereof, a pneumatically operable valve, means to produce pneumatic pulsations and to place the milk discharge under continuous suction, a pipe through which said pneumatic pulsations are transmitted direct to the outer teat cup chamber and to the valve whereby the teat may be alternately compressed and released and the operation of the valve controlled, said valve in its movement adapted to admit pressure fluid to the milk discharge simultaneously with said release and to close the admission of pressure fluid to the milk discharge simultaneously with said compression.

10. In a milking machine, in combination, a double chambered teat cup, a milk discharge from the inner chamber thereof, a pneumatically operable valve, means to produce pneumatic pulsations, a pipe through which said pneumatic pulsations are transmitted direct to the outer teat cup chamber and to the valve whereby the teat may be alternately compressed and released and the operation of the valve controlled, said valve in its movement adapted to admit pressure fluid to the milk discharge simultaneously with said release and to close the admission of pressure fluid to the milk discharge simultaneously with said compression, and a non-return valve between said pipe and the milk discharge.

11. In a milking machine, in combination, a double chambered teat cup, a milk discharge from the inner chamber thereof, a pneumatically operable valve, means to produce pneumatic pulsations, a pipe through which said pulsations are transmitted direct to the outer teat cup chamber and to the valve whereby the teat may be alternately compressed and released and the operation of the valve controlled, and an air reservoir, said valve in its movement adapted to connect said reservoir and milk discharge simultaneously with said release and to close said connection and connect said reservoir with the atmosphere simultaneously with said compression.

12. In a milking machine, in combination, a double chambered teat cup, a milk discharge from the inner chamber thereof, a pneumatically operable valve, means to produce pneumatic pulsations, a pipe through which said pulsations are transmitted direct to the outer teat cup chamber and to the valve whereby the teat may be alternately compressed and released and the operation of the valve controlled, a non-return valve between said pipe and the milk discharge, and an air reservoir, said valve in its movement adapted to connect said reservoir and milk discharge simultaneously with said release and to close said connection and connect said reservoir with the atmosphere simultaneously with said compression.

13. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, and a valve movable with the diaphragm and adapted to intermittently admit pressure fluid to the milk receiving chamber.

14. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, a valve chamber communicating with the milk receiving chamber and with the atmosphere, and a valve in said chamber movable with the diaphragm and adapted to intermittently admit pressure fluid to the milk receiving chamber.

15. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, a valve chamber communicating with the milk receiving chamber and with the atmosphere, an air reservoir, and a valve in said chamber movable with the diaphragm and adapted to alternately connect said reservoir with the milk receiving chamber and with the atmosphere.

16. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, an air admission passage to the milk receiving chamber, and a valve movable with the diaphragm and adapted to intermittently open said passage, said diaphragm adapted at one end of its movement to effectually seal said passage.

17. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, a valve chamber communicating with the milk receiving chamber and with the atmosphere, an air reservoir, and a valve movable with the diaphragm and adapted to alternately connect said reservoir with the milk receiving chamber and with the atmosphere, said diaphragm adapted at one end of its movement to effectually seal the connection between the reservoir and the milk receiving chamber.

18. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, a valve chamber communicating with the milk receiving chamber and with the atmosphere, an air reservoir adjacent the valve chamber, ports between the reservoir and valve chamber, and a valve movable with the diaphragm and having cut away parts through which and said ports the reservoir is alternately connected with the atmosphere and with the milk receiving chamber.

19. In a milking machine, in combination, a double chambered teat cup, a pulsator comprising a casing, a flexible diaphragm therein separating two chambers, one a pulsation chamber and the other a milk receiving chamber, a passage between the milk receiving chamber and the inner teat cup chamber, a passage between the pulsation chamber and the outer teat cup chamber, means to produce continuous suction in the milk receiving chamber and pneumatic pulsations in the pulsation chamber, a valve chamber communicating with the milk receiving chamber and with the atmosphere, an air reservoir adjacent the valve chamber, ports between the reservoir and valve chamber, and a valve movable with the diaphragm and having cut away parts through which and said ports the reservoir is alternately connected with the atmosphere and with the milk receiving chamber, said diaphragm adapted at one end of its movement to effectually seal the opening between the valve chamber and milk receiving chamber and prevent leakage to the latter around the valve from the air reservoir.

20. In a milking machine, in combination, a source of pneumatic pulsations, a set of double chambered teat cups, a pulsator having a pulsation chamber connected with the outer chambers of said teat cups and with the source of pneumatic pulsations, a milk receiving chamber connected with the inner or teat receiving chambers of said teat cups and adapted to be placed under continuous suction, an air reservoir, a valve movable by the variations in pressure in said pulsation chamber so as to connect the air reservoir alternately with the atmosphere and with said milk receiving chamber, and a flexible diaphragm movable with the valve and adapted at one end of the valve's movement to effectually seal the passages so as to prevent any leak from said air reservoir to the milk receiving chamber.

21. A milking machine pulsator for use with double chambered teat cups, comprising a pulsation chamber connectible with the outer chambers of the teat cups, a milk receiving chamber connectible with the inner chambers of the teat cups and constantly in communication with a source of suction, a flexible diaphragm separating the pulsation chamber from the milk-receiving chamber, an air reservoir, and a valve movable in one direction by atmospheric pressure on its end and in the other direction by the flexible diaphragm and adapted in its movement to connect the reservoir alternately with the atmosphere and with the milk receiving chamber so as to admit measured volumes of air to cause momentary reductions in the vacuum in said milk receiving chamber; in combination with means to produce pneumatic pulsations in the pulsation chamber.

22. A milking machine pulsator for use with double chambered teat cups, comprising a pulsation chamber connectible with the outer chambers of the teat cups, a milk receiving chamber connectible with the inner chambers of the teat cups, a flexible diaphragm separating the pulsation chamber from the milk-receiving chamber, an air reservoir, and a valve movable in one direction by atmospheric pressure on its end and in the other direction by the flexible diaphragm and adapted in its movement to connect the reservoir alternately with the atmosphere and with the milk receiving chamber so as to admit measured volumes of air to cause momentary reductions in the vacuum in said milk receiving chamber; in combination with a milk pail connected with the milk receiving chamber, a pipe connected with the pulsation chamber and with the milk pail, a non-return valve in the last-named connection to the milk pail and means to produce pneumatic pulsations in said pipe.

In testimony of which invention, I have hereunto set my hand, at Poughkeepsie, N. Y., on this 30th day of Jany., 1915.

MEREDITH LEITCH.

Witnesses:
CHARLES L. POWELL,
EDWARD F. WEIMAR.